(12) United States Patent
Lato et al.

(10) Patent No.: US 9,333,978 B2
(45) Date of Patent: May 10, 2016

(54) TRANSPORTATION CONTAINER RETENTION DEVICE

(71) Applicants:Mark C. Lato, Glenview, IL (US); Matt Jacobs, Wilmette, IL (US)

(72) Inventors: Mark C. Lato, Glenview, IL (US); Matt Jacobs, Wilmette, IL (US)

(73) Assignee: Pallet Wrapz, Inc., Glenview, IL (US)

( * ) Notice: Subject to any disclaimer, the term of this patent is extended or adjusted under 35 U.S.C. 154(b) by 0 days.

(21) Appl. No.: 14/291,393

(22) Filed: May 30, 2014

(65) Prior Publication Data

US 2014/0356091 A1  Dec. 4, 2014

Related U.S. Application Data

(60) Provisional application No. 61/829,820, filed on May 31, 2013.

(51) Int. Cl.
*B60P 7/08* (2006.01)
*B62B 5/00* (2006.01)
*B65D 71/00* (2006.01)
*B65D 71/02* (2006.01)

(52) U.S. Cl.
CPC ............. *B62B 5/0013* (2013.01); *B60P 7/0876* (2013.01); *B65D 71/0096* (2013.01); *B65D 71/02* (2013.01); *B65D 2571/00012* (2013.01)

(58) Field of Classification Search
CPC ..... B60P 7/04; B60P 7/0876; B65D 71/0096; B65D 71/02; B65D 2571/00012
USPC ........ 410/96, 97, 98, 99, 34, 35, 46, 117, 118
See application file for complete search history.

(56) References Cited

U.S. PATENT DOCUMENTS 2,455,237 A * 11/1948 Davis .................... B60P 7/0876
                                                           410/97
5,226,544 A    7/1993 Gallucci et al.
5,784,761 A *  7/1998 Allen
7,934,894 B1   5/2011 Temple

* cited by examiner

*Primary Examiner* — Stephen Gordon
(74) *Attorney, Agent, or Firm* — Vedder Price P.C.

(57) ABSTRACT

A transportation container retention device includes a main panel and an extension panel. The extension panel includes a bottom edge connected to a top edge of the main panel and is configured such that the extension panel can be moved from a first position in which the extension panel overlays the main panel to a second position in which the extension panel is contiguous to the main panel. In this configuration, the transportation retention device is operable to retain various heights of articles located on transportation containers.

1 Claim, 12 Drawing Sheets

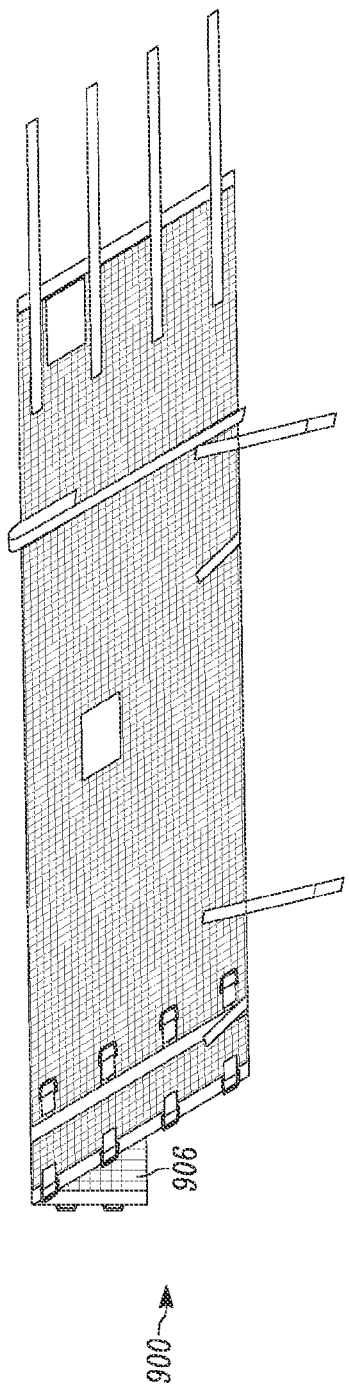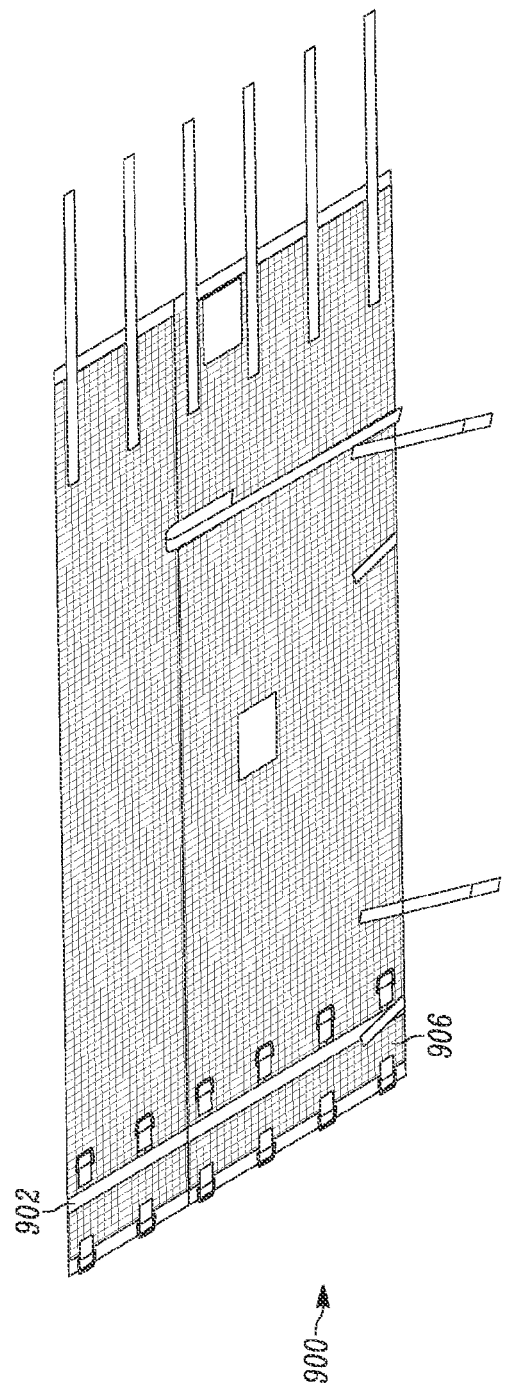

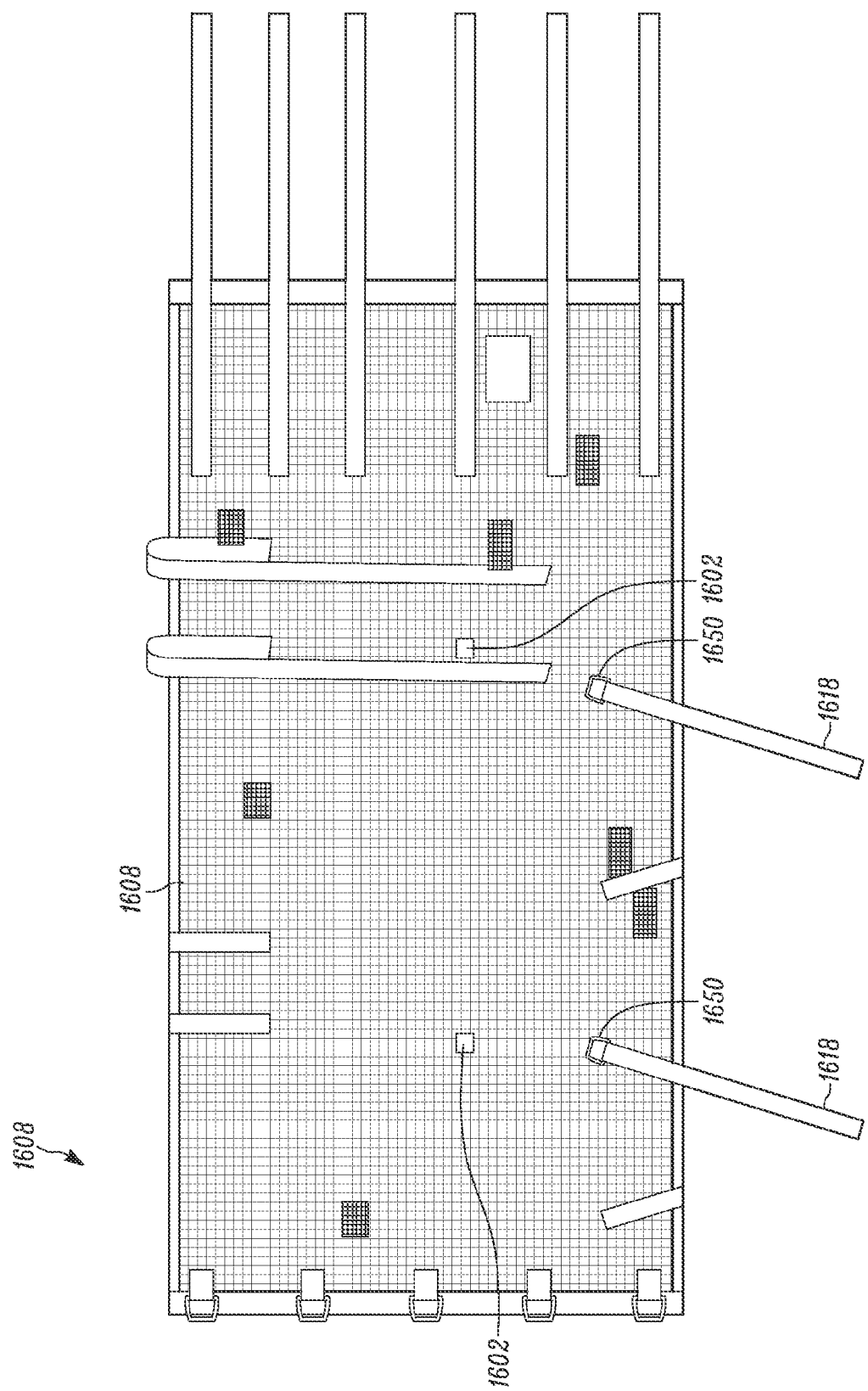

TRANSPORTATION CONTAINER RETENTION DEVICE

RELATED APPLICATIONS

This application claims the benefit of U.S. Provisional Patent Application No. 61/829,820 filed May 31, 2013, the contents of which are hereby incorporated by reference herein.

BACKGROUND

The present disclosure relates to a reusable device for the retention of articles or other items to be transported via various methods. In the transportation or logistics industry is it common to use various methods to transport goods from one place to another. One such method is through the use of transportation platforms such as pallets. Boxes or other shipping containers are stacked on pallets and then the platform or pallet can be moved as a single unit with a forklift or other mechanical device.

One issue that arises in the use of palletized goods is that the boxes or load can shift or otherwise move during transportation. If the goods fall off the palletized load, the goods need to be reloaded and the goods can become damaged. One solution to this problem is through the use of shrink-wrap film. Shrink-wrap film can be unrolled and deposited around palletized loads to hold the wrapped goods in position during transportation.

The use of shrink-wrap, however, has several disadvantages. The process of shrink-wrapping palletized loads is time consuming. Furthermore, the removal of the shrink-wrap is also an inefficient process and labor-intensive. Shrink-wrap film also can only be used once and requires disposal after each use.

Therefore, an improved product and process is needed to reduce the time to secure goods in a palletized load. Further, a product that does not need to be disposed of or provides improvements with regards to its environmental footprint is needed.

Similarly, goods that are transported on trolleys, carts, hand-trucks, or other similar means face similar issues. Goods loaded onto carts and other trolleys can also shift or fall that would require re-loading or even replacement of damaged goods. A need therefore exists for an improved product and process for securing goods in position in a cart or trolley.

SUMMARY

In one embodiment, a transportation container retention device includes a main panel and an extension panel. The extension panel includes a bottom edge connected to a top edge of the main panel such that the extension panel can be moved from a first position in which the extension panel overlays the main panel to a second position in which the extension panel is contiguous to the main panel by moving the extension panel about the bottom edge. The transportation container retention device further includes a side strap connected to the main panel. The side strap connects a first end of the main panel to a second end of the main panel. The transportation contained retention device is operable to retain a first height of articles in the first position and a second height of articles in the second position wherein the second height of articles is larger than the first height.

In a second embodiment, the transportation container retention device further includes a restraint connected to the lower edge of the main panel at an oblique angle. The restraint is capable of securing the retention device to the transportation container.

In another embodiment, the transportation container retention device also includes a strap grabber located approximately midway between the top edge and the lower edge of the main panel. The strap grabber is configured to releasably connect to the side straps.

In still another embodiment, the transportation container retention device includes a front section and a back section. the front and back sections are connected to each other. The back section includes one or more back tabs and one or more side secure tabs. The back tabs and the side secure tabs are complimentary to one another such that the back section of the transportation container retention device can be secured to a cart by wrapping the side secure tab around a side member of the cart and securing the side secure tab to the complimentary back tab.

In another embodiment, the transportation container retention device also includes a cover section. The cover section is positioned between and is connected to the front section and the back section. The cover section includes one or more cover tabs that are configured to wrap around and secure to a top member of the cart.

In yet another embodiment, a method of securing articles in a transportation container is described. The method includes securing a first and a second edge of a back section of a retention device to a back side of the transportation container. The method also includes loading one or more articles into the transportation and securing a front section of the retention device to a front side of the transportation container by connecting front tabs positioned along the front section to the side secure tabs that are securing the back section to the transportation container. The method may also include folding the front section up and over the top of the transportation container. The method may also include unloading the one or more articles from the transportation container without removing the back section from the transportation container.

BRIEF DESCRIPTION OF THE SEVERAL VIEWS OF THE DRAWING

The following disclosure as a whole may be best understood by reference to the provided detailed description when read in conjunction with the accompanying drawings, drawing description, abstract, summary, detailed description, background, and other headings, where included. Identical reference numerals when found on different figures identify the same elements of a functionally equivalent element. The elements listed in the abstract are not referenced but nevertheless refer by association to the elements of the detailed description and associated disclosure.

FIG. 9 is an image of another embodiment of the present disclosure in an unfolded configuration.

FIG. 10 is an image of the embodiment of FIG. 9 in a folded configuration.

FIG. 16 is a plan view of another embodiment of a pallet wrap of the present disclosure.

DETAILED DESCRIPTION

Figure 1:
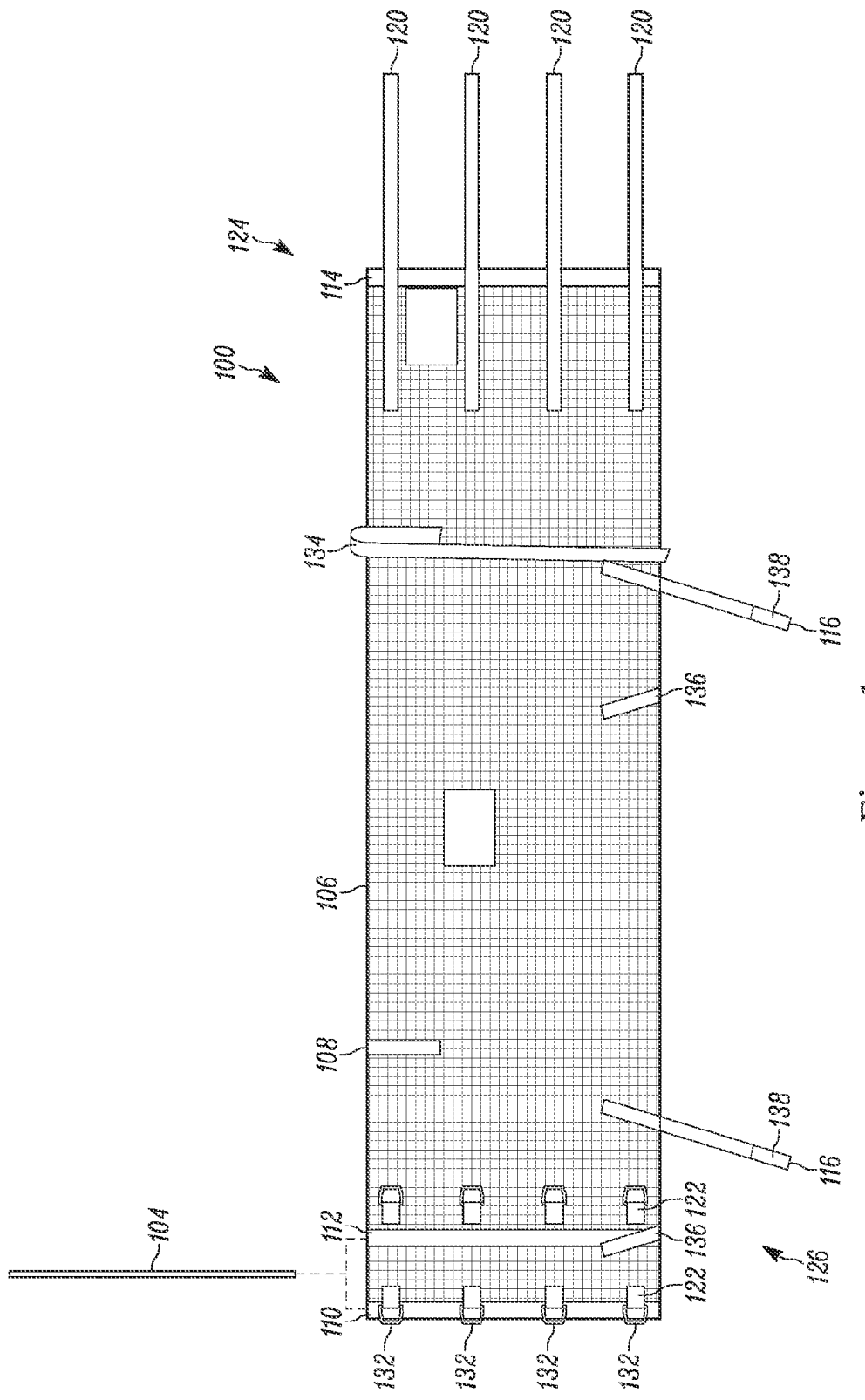
FIG. 1 is a plan view of the front side of one embodiment of the present disclosure.

The present disclosure is not limited to the particular details of the assemblies depicted, and other modifications and applications may be contemplated. Further changes may be made in the assemblies without departing from the true spirit of the scope of the disclosure herein involved. It is intended, therefore, that the subject matter in this disclosure should be interpreted as illustrative, not in a limiting sense.

In one embodiment of the present disclosure, as shown in FIGS. 1 through 4, a pallet wrap 100 is configured to retain articles 128 stacked on a pallet 102. In this example, pallet wrap 100 includes main panel 106, side straps 120, top strap 130, restraint 116, first pocket 114, second pocket 112, and third pocket 110, and strap connection points 132.

In one embodiment, the main panel 106 of pallet wrap 100 is a piece of material to which the other elements of the device are attached. Main panel 106 can be made of vinyl coated polyester mesh but other types of material can also be used. Other suitable natural and synthetic materials can also be used such as canvas, nylon, polypropylene, polyethylene, cotton, or composite woven materials as well. As shown in FIG. 1, main panel 106 is preferably rectangular in shape so as to appropriately interface with a transportation platform such as a pallet. As shown in FIGS. 5 through 8, main panel 106 has an appropriate length such that when pallet wrap 100 is wrapped around a plurality of articles 128 stacked on a transportation platform or pallet 102, pallet wrap 100 substantially surrounds the plurality of articles 128. A gap, as shown FIG. 5, may exist between the ends of main panel 106 when pallet wrap 100 is installed. Preferably, the gap is less than twelve inches but other gaps and configurations can be used depending on the size of articles 128 being transported.

Figure 6:
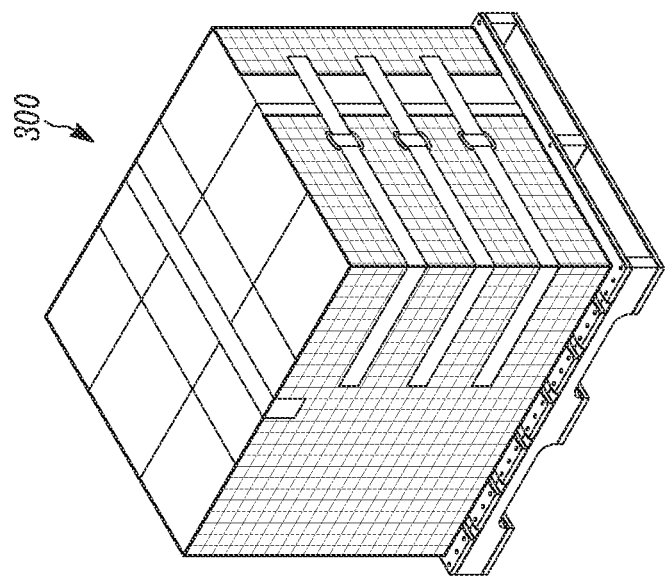
FIG. 6 is an illustration on another embodiment of the present disclosure.
Figure 8:
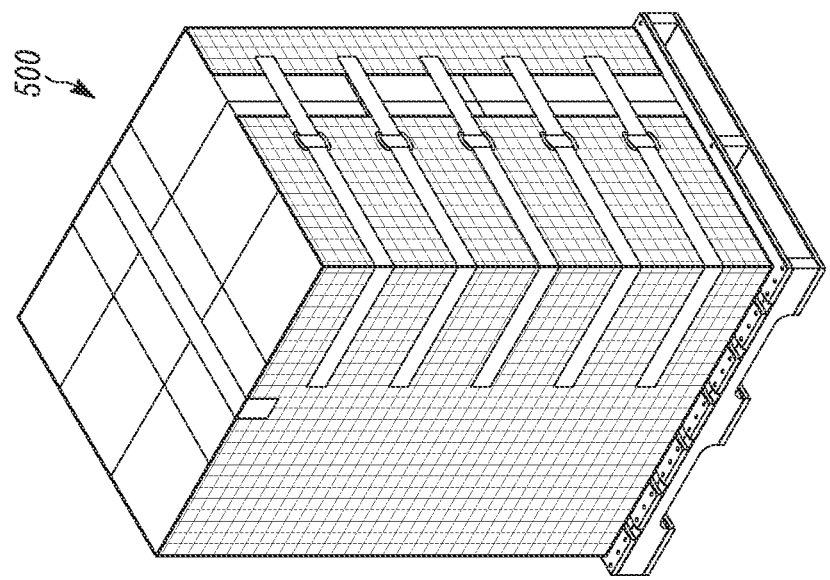
FIG. 8 is an illustration on another embodiment of the present disclosure.
Figure 7:
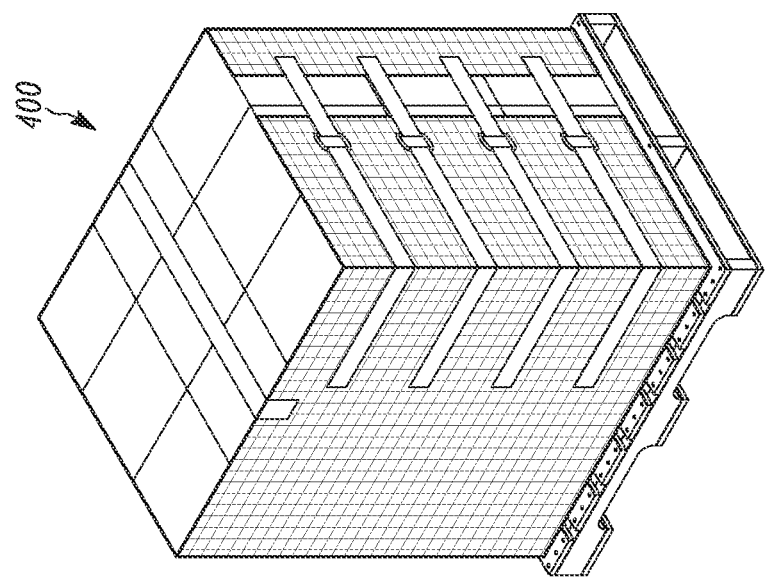
FIG. 7 is an illustration on another embodiment of the present disclosure.
Figure 11:
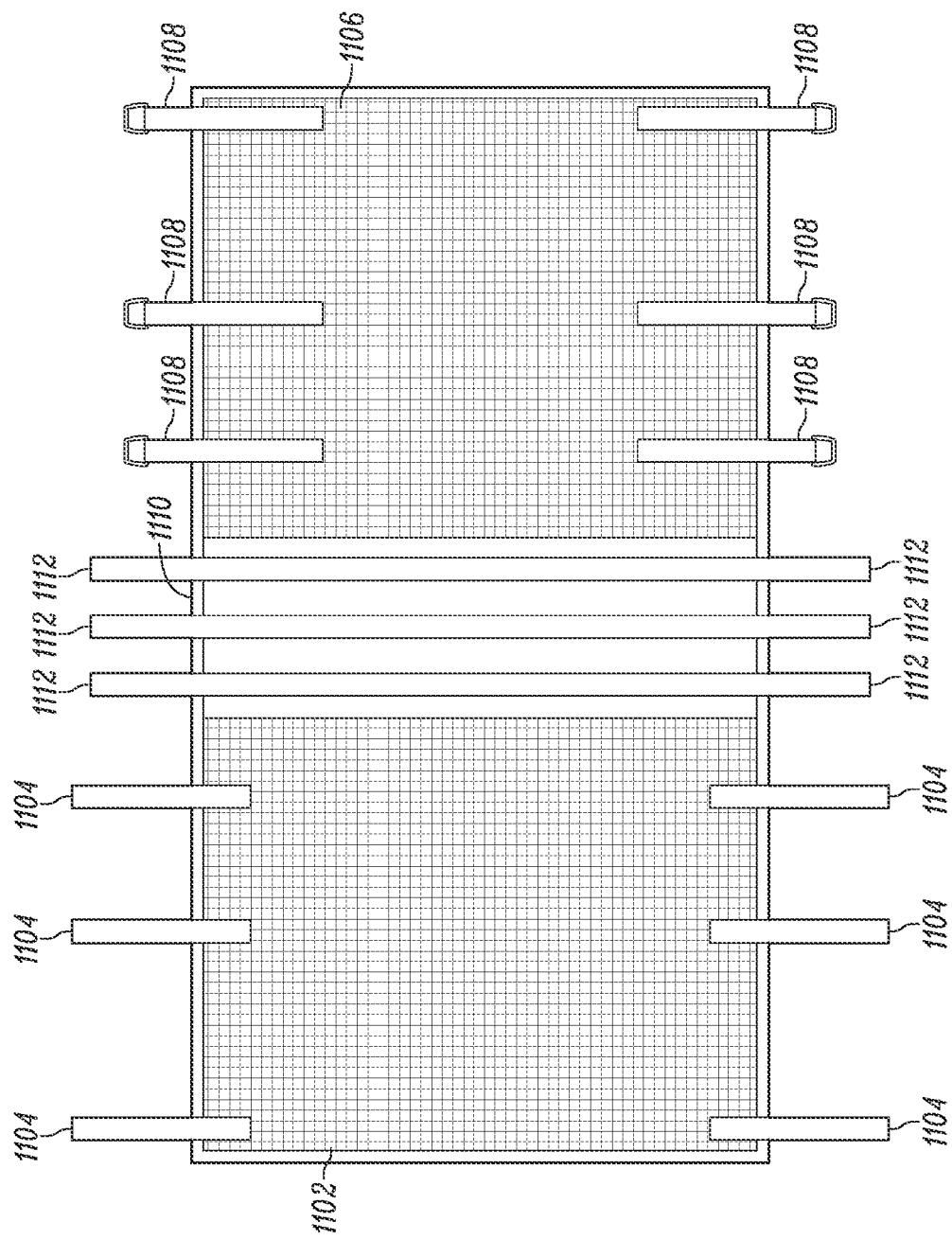
FIG. 11 is a plan view of the top side of one embodiment of a cart wrap of the present disclosure.

In one example, pallet wrap 100 is used in conjunction with a traditional size pallet and the main panel 106 of pallet wrap 100 is approximately fourteen feet long and has a height of four feet. Other sizes of main panel 106 can also be used as well as other shapes, however, so long as pallet wrap 100 is able to prevent a plurality of articles 128 from unwanted movement or shifting during transportation. As stated above, main panel 106 may have a height of four feet in one example. Other heights of main panel 106 may also be used. As shown in FIGS. 6, 7 and 8, different heights of main panel 106 may be used to create small height pallet wrap 300, with a height of two feet, medium height pallet wrap 400, with a height of four feet, and tall height pallet wrap 500, with a height of six feet. Other heights can also be used such that the size of main panel 106 is configured for the needs of a user or to be used to interface with a certain size or shape article 128.

In one embodiment, referring back to FIG. 1, side straps 120, top strap 130, restraint 116, first pocket 114, second pocket 112, and third pocket 110, and strap connection points 132 may be attached to main panel 106 of pallet wrap 100. In this embodiment, four side straps 120 extend from a first end of main panel 106. Each side strap 120 can be made of two inch wide nylon webbing material but other sizes and materials can be used. A portion of each side strap 120 is attached to main panel 106 and another portion extends outward from first end of main panel 106.

Figure 5:
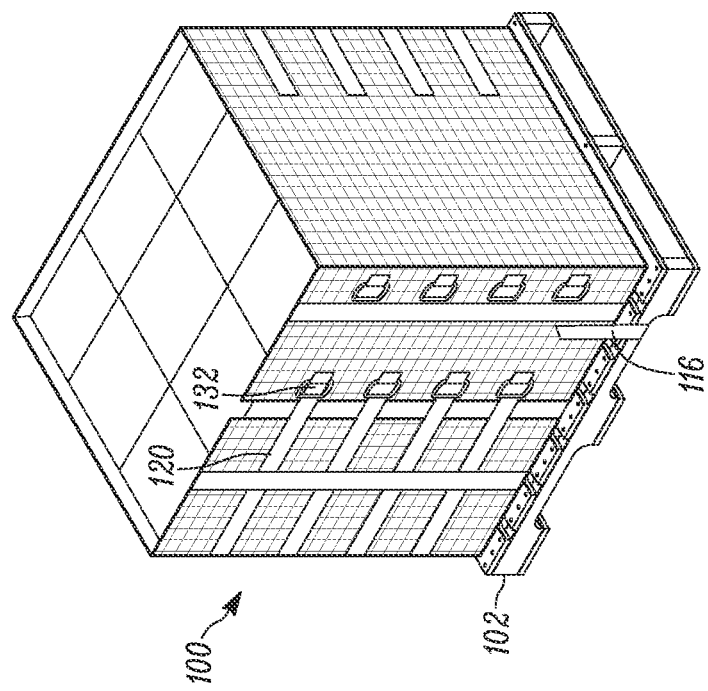
FIG. 5 is another image showing an example pallet wrap in use.

Located on a second edge of main panel 106 are strap connection points 132. In this example, two rows of four strap connection points 132 are attached to and positioned along and near second end of main panel 106. Each row of strap connection points 132 is configured to interface with the side straps 120 previously described. As can be seen in FIG. 5, when main panel 106 is wrapped around a plurality of articles stacked on a pallet, side strap 120 interfaces with connection point 132 so as to secure main panel 106 in position around articles 128.

As shown in FIG. 1, in this example side strap 120 includes pieces of hook and loop fasteners and connection points 132 include a metal D-ring. In this example, when main panel 106 is wrapped around articles 128 on pallet 102, side strap 120 is inserted through the D-ring on connection point 132 and folded back on itself such that the complimentary pieces of hook and loop fasteners retain side strap 120 in position and keep pallet wrap 100 snugly positioned around articles 128. In this fashion, in this example, each side strap 120 can be looped through a connection point 132 to retain pallet wrap 100 in a desired position. Other configurations of side strap 120 and connection point 132 can also be used, such as, interfacing clips, snaps, hooks, cleats, and the like.

As can be seen in FIG. 1, two rows of connection points 132 may be provided on main panel 106. In this configuration, a second row of connection point 132 allows for interfacing with side straps 120 such that pallet wrap 100 can be used with varying sizes of pallets or varying loads or sizes of articles 128 that may be stacked on a transportation platform. In this example, two rows of connection points 132 can be included on main panel 106 but in other examples more rows and configurations of connection points 132 or side straps 120 can be provided to as to provide further flexibility of use.

Figure 4:
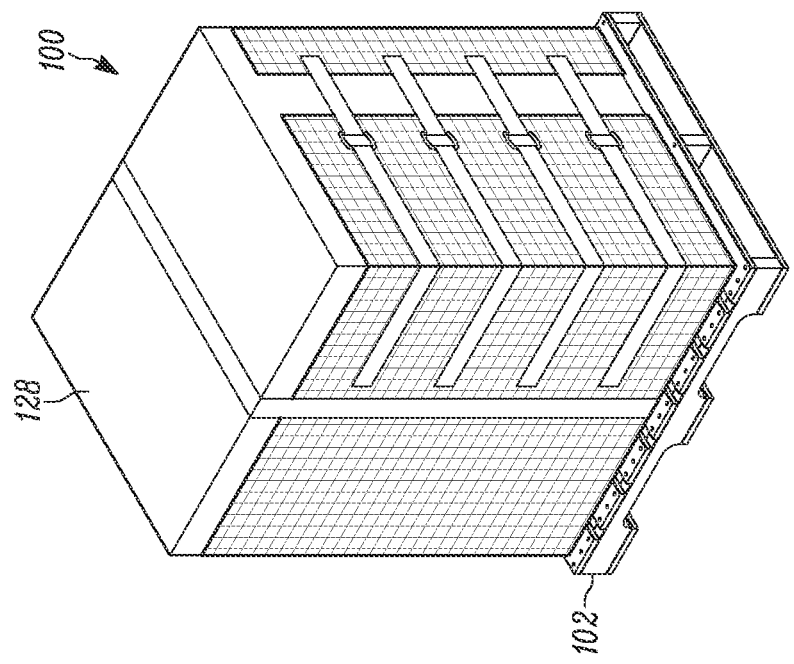
FIG. 4 is another image showing an example pallet wrap in use.
Figure 3:
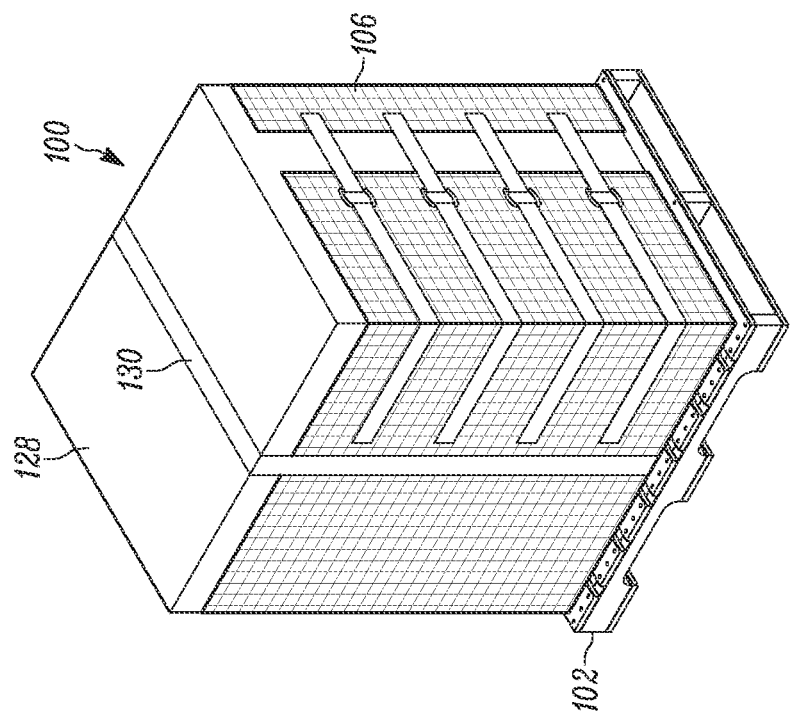
FIG. 3 is an image showing an example pallet wrap in use.

As stated above, main panel 106 may also include top strap 134. Top strap 134 may also be a piece of nylon webbing. Top strap 134 extends upward from a top edge of main panel 106. Top strap 134 is configured to interface with and connect to top attachment point 108. In one example, top strap 134 and top attachment point have pieces of interfacing hook and loop fasteners that allow top strap 134 to be secured to top attachment point 108. As can be seen in FIGS. 3 and 4, top strap 134 is configured so as to extend across a stack of articles 128 that may be located on pallet 102 and attach to an opposite surface of main panel 106 when main panel 106 has been wrapped around articles 128. Top strap 134 further provides stability and restricts movement of articles 128 when installed as described and shown.

Referring back to FIG. 1, pallet wrap 100 also includes restraints 116 and restraint attachment points 136. Restraint 116 can also be a length of nylon webbing or other material. Restraint 116, as can be seen, extends downward from a bottom of main panel 106. In one embodiment, restraint 116 extends downward at an oblique angle from bottom edge of main panel 106. Restraint 116 may include a piece of hook and loop fastener that complimentarily interfaces with a second piece of hook and loop fastener located at restraint attachment point 136. As can be appreciated, the position of restraint attachment point 136 on main panel 106 is configured such that the two are at complimentary oblique angles such that the two can be easily joined as will be explained. Additionally, in one embodiment, inside or attached to restraint 116 is a stiffening member 138. Stiffening member 138 may be foam encased inside of restraint 116 but it may also be a piece of semi-rigid material such as plastic, or other suitable material. Stiffening member 138 provides added rigidity to restraint 116 such that restraint 116 can be pushed or fed through openings or under pallet 102 during installation.

Restraint 116, in this embodiment, is used to secure pallet wrap 100 to a transportation platform such as pallet 102. As can be seen in FIG. 5, when pallet wrap 100 is installed around a plurality of articles 128 on pallet 102, restraint 116 can be pushed, pulled, or otherwise fed through an opening on pallet 102. The end of restraint 116 is then attached to restraint attachment point 136. As can be appreciated, stiffening member 138 assists the user in feeding restraint 116 under pallet 102. In this manner, pallet wrap 100 is secured to pallet 102. Pallet wrap 100 may include one or more restraints 116 located at each corner or at other locations. In one example, two restraints 116 are provided such that the restraints 116 and complimentary restraint connection points 136 are located at two corners of pallet 102, at corners diagonally opposite one another.

Referring now to the embodiment shown on FIG. 16, restraint 1618 may also include restraint D-ring 1650. Restraint D-ring 1650 is attached at or near to the end of restraint 1618 that is attached to main panel 1608. In the course of use of pallet wrap 1600, restraint 1618 may become damaged, torn, or otherwise unusable. Restraint D-ring 1650 is provided such that a replacement or additional restraint 1618 can be added to pallet wrap 1600. This feature allows for continued use of pallet wrap 1600 without the need for repair of the damaged restraint 1618. Instead, a replacement restraint can be provided that can be attached to restraint D-ring 1650 and used as if the damaged restraint 1618 was still operational. Other types or configurations of restraint D-ring could also be provided such as additional hook and loop fasteners, clips, cleats, or other suitable attachment means. In addition, restraint D-ring 1650 could be provided separate from restraint 1618 such as separately attached at or near the attachment location of restraint 1618 to main panel 1608.

Further provided in the embodiment shown in FIG. 16 is strap grabber 1602. In this embodiment, strap grabber 1602 is a piece of hook and loop fastener attached to main panel 1608. Strap grabber 1602 can be any suitable releasable fastener that can releasably attach to one of more of the straps associated with pallet wrap 1600. In this example, strap grabber 1602 is located approximately midway between the top edge and the bottom edge of main panel 1608. Strap grabber 1602 is configured to releasably connect to one or more straps of pallet wrap 1600 so that the free end of a strap can be retained so that the free end of a strap does not interfere during the installation of pallet wrap 1600. For example, when pallet wrap 1600 is being wrapped around a plurality of articles 128 on a transportation platform, restraint 1618 would likely be dangling at or near the floor. With restraint 1618 in this position, the operator could step on restraint 1618 or restraint 1618 could become tangled around one or more of the other elements of pallet wrap 1600. To keep restraint 1618 up off of the floor or away from other elements, the free end of restraint 1618 can be attached to strap grabber 1602. As can be appreciated one or more of the other straps could also be attached to strap grabber 1602 as well.

Referring back to the embodiment shown in FIG. 1, pallet wrap 100 may also include first pocket 114, second pocket 112, third pocket 110 and one or more rods 104. First pocket 114 is piece of material, such as nylon webbing, attached to main panel 106 at or near a first end. First pocket is configured such that it can receive rod 104. Rod 104, in one example is a piece of PVC tubing with an outer diameter of three-quarters of an inch. Other types, materials, and sizes of rod 104 can also be used as are known to one of ordinary skill in the art. An opening can be located at an upper end of first pocket 114 such that rod 104 can be inserted into first pocket 114. In this manner, when installed in first pocket 114, rod 104 extends along first end of main panel 106 and is retained in this general position. Second pocket 112 and third pocket 110 can also be provided similarly to first pocket 114. Second pocket 112 and third pocket 110, in this example, are located at or near the rows of strap connection points 132. Second pocket 112 and third pocket 110 can also be configured to receive rods 104. First pocket 114, second pocket 112, and third pocket 110 with installed rods 104 provide structure to pallet wrap 100. When pallet wrap 100 is installed onto a plurality of articles 128 on a transportation platform, the size of main panel 106 can be unwieldy to manipulate and wrap around articles 128. The structure that can be added to pallet wrap 100 helps during installation, removal and storage of pallet wrap 100.

Figure 2:
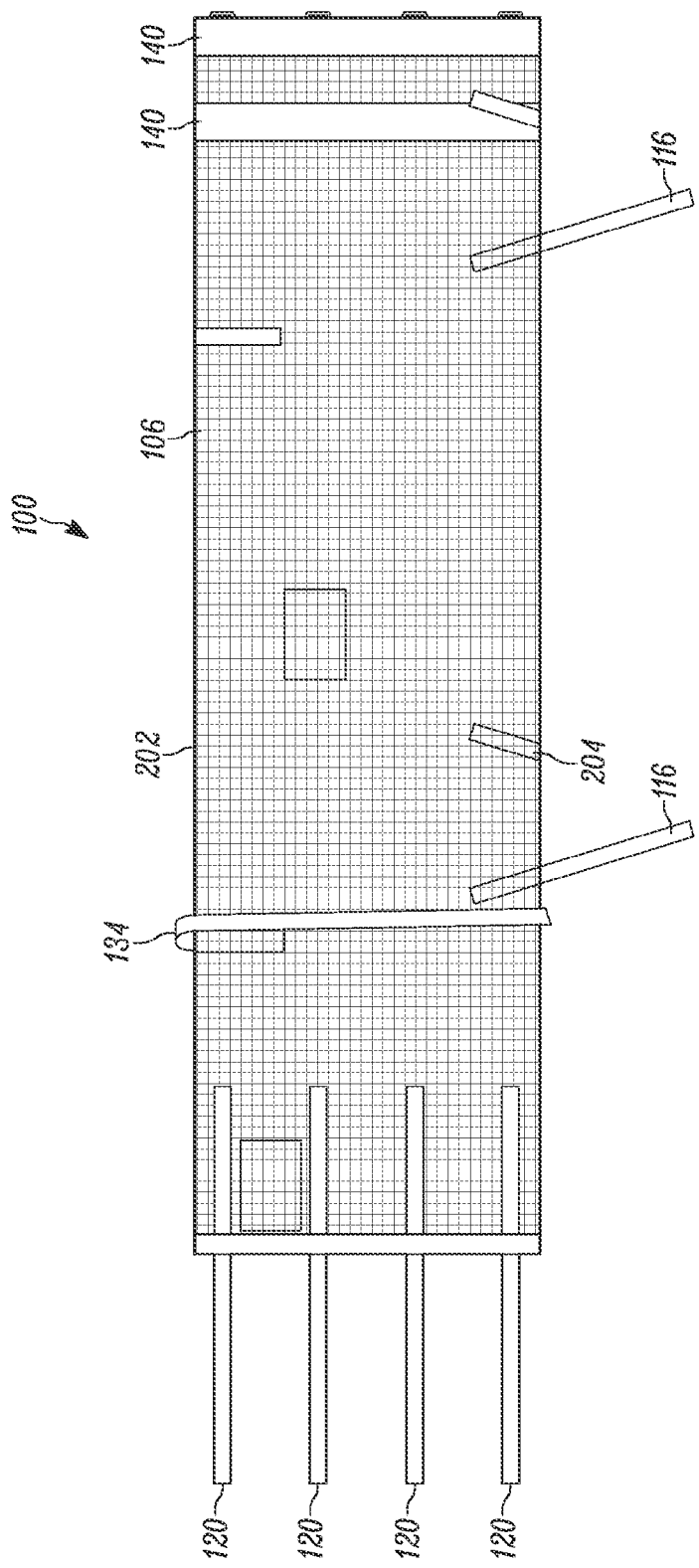
FIG. 2 is a plan view of the back side of the embodiment of FIG. 1.

In one embodiment, and as shown in FIG. 2, pallet wrap 100 may include reinforcing elements 140 located at or near the locations at which the different elements are attached to main panel 106. The above-described elements, such as for example, side straps 120, strap connection points 132, top strap 134, and restraint 116, can be stitched to main panel 106. In other examples, the elements may be glued, welded, riveted, or the like. Reinforcing elements 140 can be located on a back side of main panel 106, as shown in FIG. 2. The attachment, whether stitched or otherwise, can then be placed through both the attached element, such as a strap, on the front side of main panel 106, through main panel 106 and through reinforcing element 140. In this manner, pallet wrap including the attached elements is more durable and reliable for repeated use.

Figure 18:
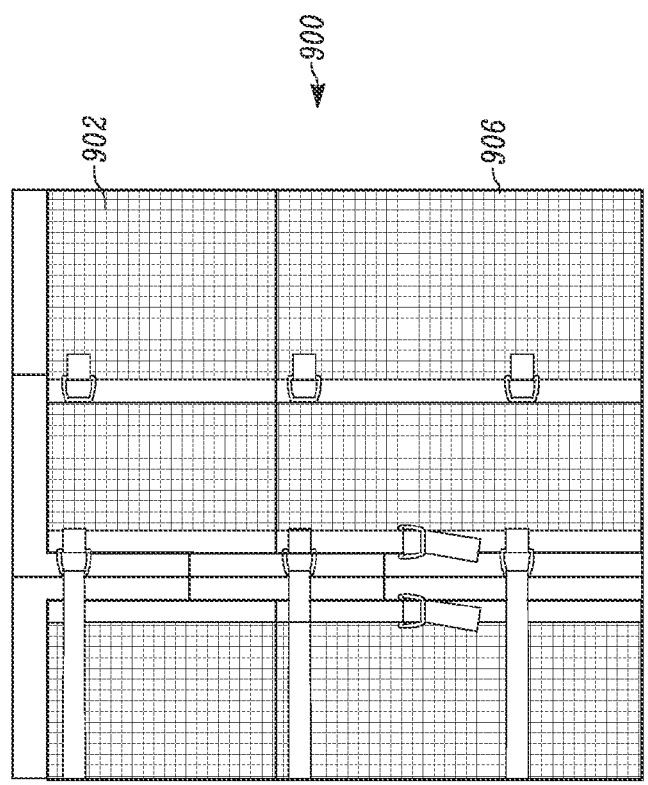
FIG. 18 is an image of the embodiment of FIG. 9 in use.
Figure 17:
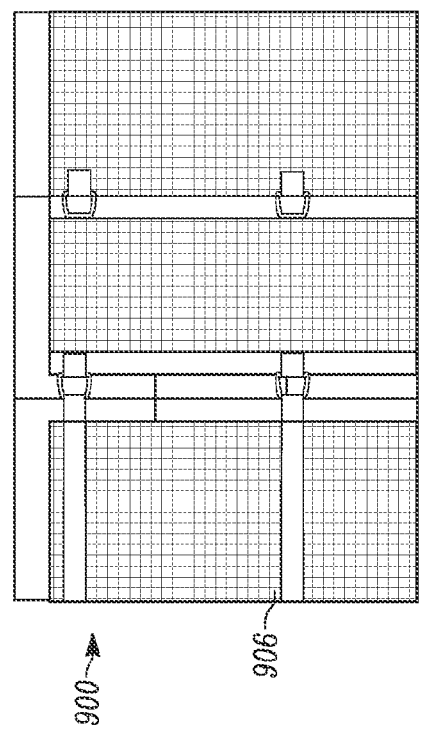
FIG. 17 is an image of the embodiment of FIG. 9 in use.

In another embodiment, shown in FIGS. 9 and 10, a pallet wrap is provided with the capability to extend to a larger size such that varying heights of stacked articles 128 can be accommodated. Extended pallet wrap 900 can be similar to the configuration of pallet wrap 100 with the addition of extension panel 902. Extension panel 902 can be similar to the main panel 106 of pallet wrap 100. Extension panel can include side straps, D-rings, strap connection points, top straps, pockets and rods as described above. Extension panel 902 is configured such that, in a first state, it can be folded over onto main panel 906 as shown in FIGS. 9 and 17. In this configuration, extended pallet wrap 900 is configured to fit a first size of stacked articles, for example a four foot tall stack of articles. Extension panel 902 can also be operated in a second state, as shown in FIGS. 9 and 18, in which the extension panel 902 is in an extended position that effectively creates a larger surface for the wrapping of articles. In the second state, extended pallet wrap 900 can be installed onto, for example, a six foot tall stack of articles. FIGS. 17 and 18 show extended pallet wrap in use. FIG. 17 shows extended pallet wrap 900 in use in a first state where the size of the articles is at a first height. FIG. 18 shows extended pallet wrap 900 in use where the size of articles is larger than the height in the first state. As shown in FIG. 18, extension panel 902 is raised such that the additional height can be accommodated.

In still another embodiment, as shown in FIGS. 11 through 15, a cart wrap 1100 is provided. In this embodiment, cart wrap 1100 is configured for use with a cart such as a U-boat or similar transportation trolley. In this embodiment, cart wrap 110 includes front section 1102, front tabs 1104, back section 1106, back tabs 1108, cover section 1110, cover tabs 1112, and side secure tabs 1114. Front section 1102, back section 1106 and cover section 1110 are panels of material that can be a single piece of material or separate pieces of material attached together. Front section 1102, back section 1106 and cover section 1110 can also be made of the same material of different materials. In one embodiment, front section 1102 and back section 1106 are made of vinyl coated polyester mesh and cover section 1110 is made of vinyl. Other natural and synthetic materials can also be used as are known to one of ordinary skill in the art.

In one embodiment, cover section 1110 is positioned between front section 1102 and back section 1106. Attached to front section 1102 are front tabs 1104. Front tabs 1104 extend outward from side edges of front section 1102. Front tabs, in one example, are made of nylon webbing, but other suitable materials can also be used. Cart wrap 1100 can include one or more front tabs 1104. In the embodiment shown in FIG. 11, six front tabs 1104 extend from front section 1102. Three front tabs can be positioned on each edge of front section 1102. Other configurations can also be used.

In a complimentary arrangement, in this embodiment, back tabs 1108 can be positioned along edges of back section 1106. Back tabs 1108 can also be made of nylon webbing or other suitable material. Back tabs 1108 extend outward from edges of back section 1106 and include a connection element. Connection element can be one or more D-rings as shown but other types of connection elements such as clips, hook and loop fasteners, snaps, buttons, or like can also be used.

Figure 12:
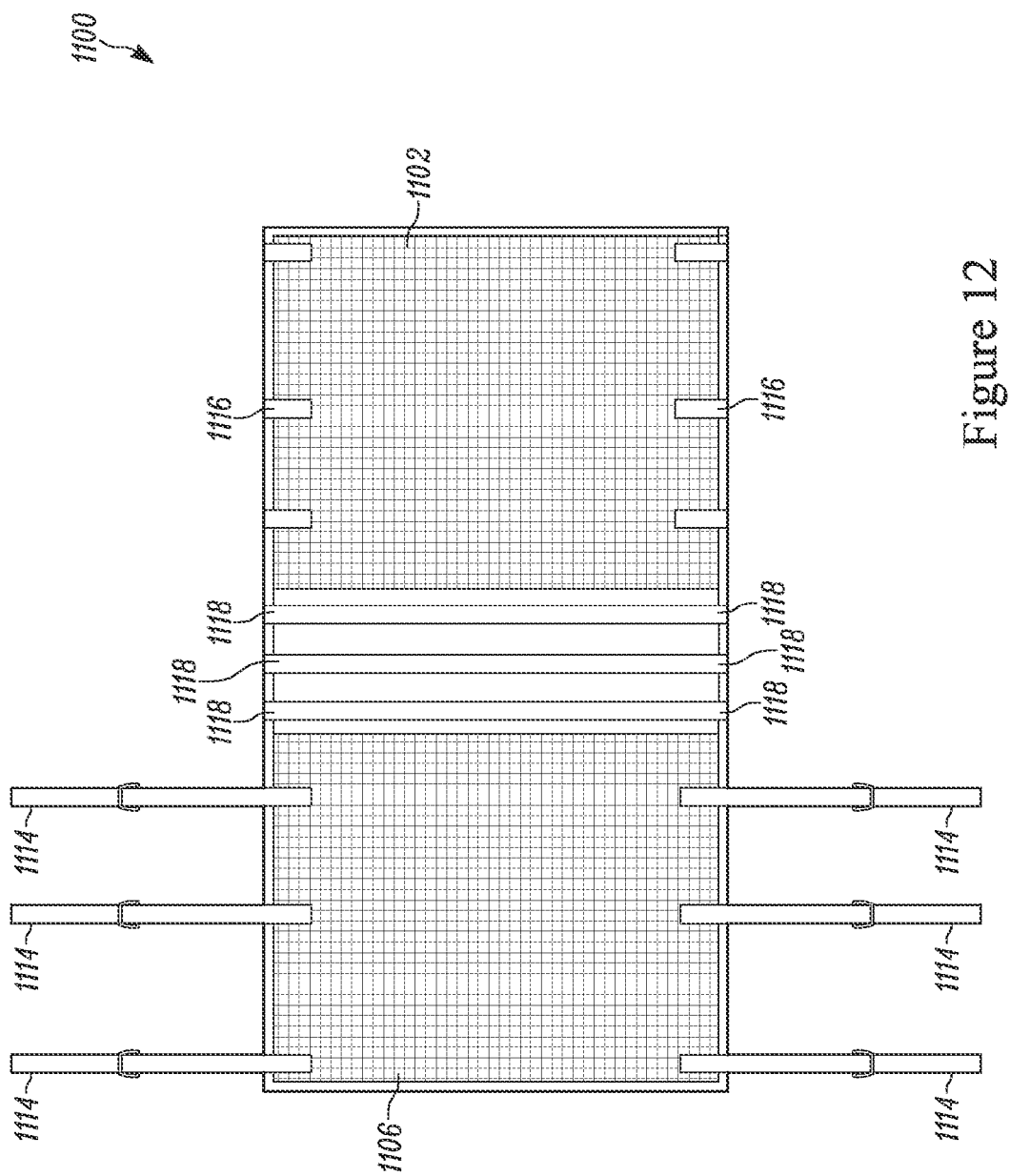
FIG. 12 is a plan view of the bottom side of the embodiment of FIG. 11.

Referring now to FIG. 12, the bottom side of cart wrap 1100 is shown. Cart wrap 110 may also include side secure tabs 1114. Side secure tabs 1114 can be made of nylon webbing but other suitable materials can also be used. Side secure tabs 114 extend outward from back section 1106. In this embodiment side secure tabs are attached to the bottom side of back section 1106 and are positioned and configured in a similar pattern to back tabs 1108. In this example configuration, reinforcement webbing is not required on bottom side of back section 1106 at the attachment locations. As can be appreciated, the attachment method, either stitching or other method as previously described, can be placed through back tabs 1108, back section 1106, and side secure tabs 1114 to provide a durable connection. At the location of attachment of front tabs 1104 on back section 1102, reinforcements 1116 are located on the bottom side of front section 1102 to increase the durability of the attachment. Also, on this embodiment, located in a configuration complimentary to cover tabs 1112 but on the bottom side of cover section 1110 are cover tabs attachment points 1118. Cover tab attachment points can be interfacing pieces of hook and loop fastener material. Cover tab attachment points not only can provide increased durability of attachment of cover tabs 1112 to cover section 1110 but also allow cover tabs 1112 to releasably attach to cover tab attachment points as will hereafter be described.

Figures 13, 14:
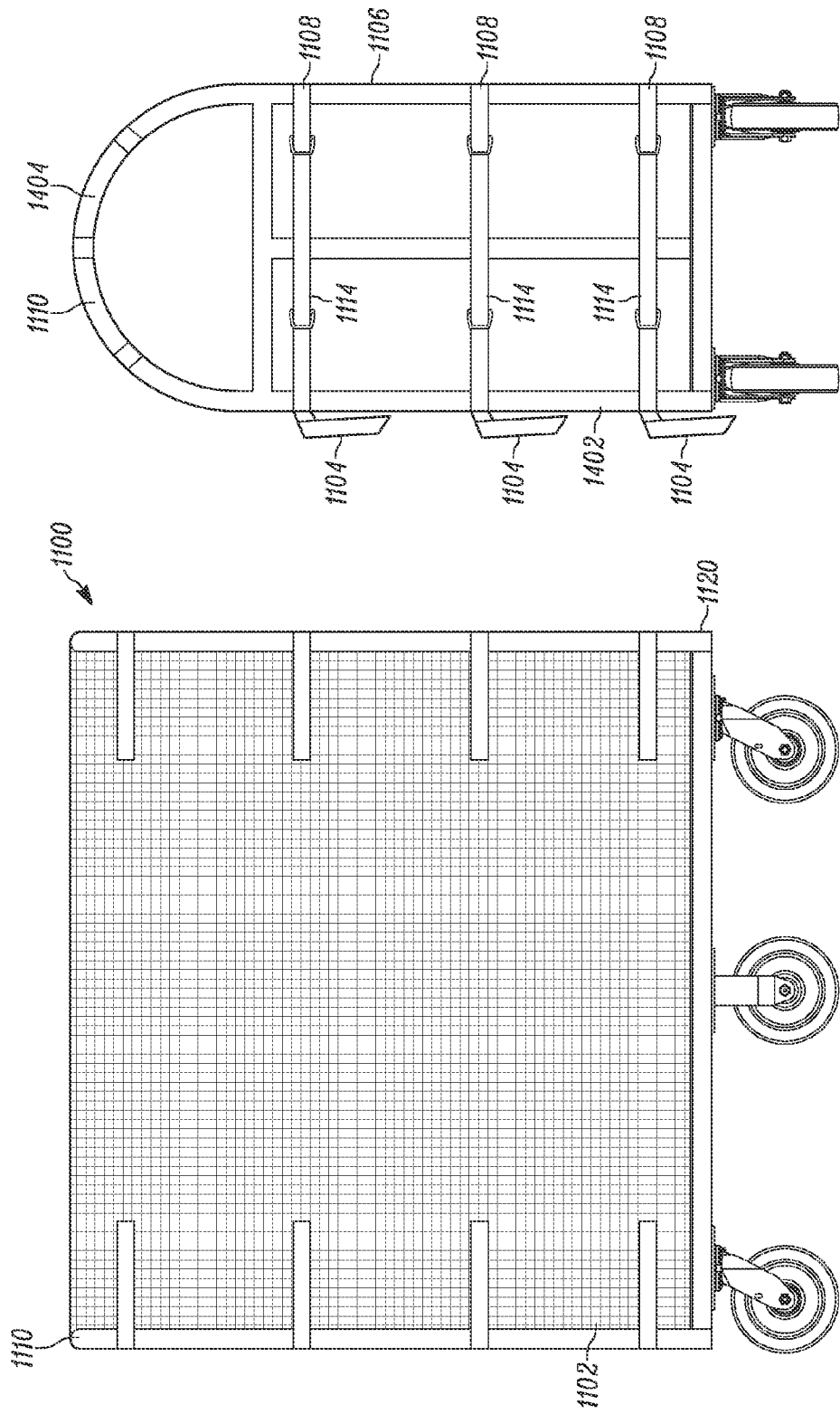
FIG. 13 is an image of an embodiment of a cart wrap in use.
FIG. 14 is an image showing a side view of the embodiment of FIG. 13.
Figure 15:
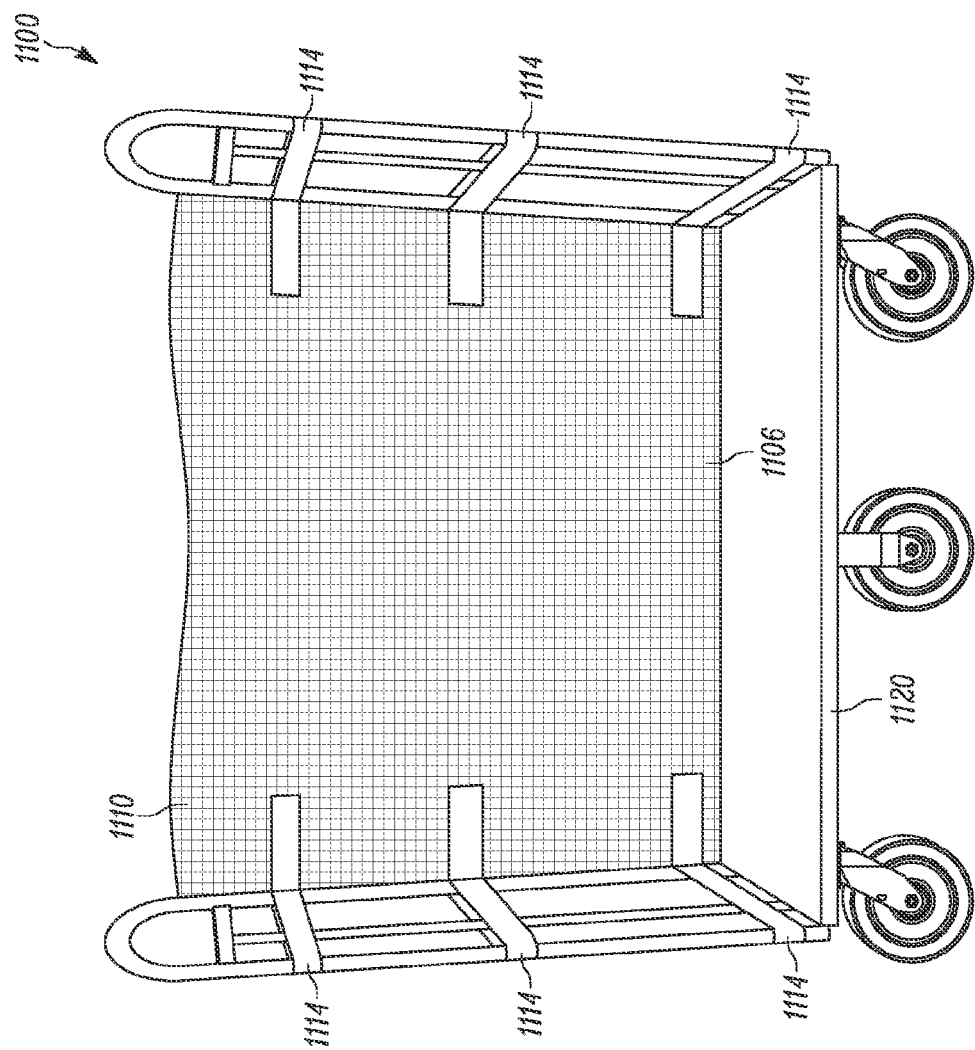
FIG. 15 is an image showing the embodiment of FIG. 13 with the front section in an unsecured state.

As seen in FIGS. 13-15, cart wrap 1100 can be removably attached to a mobile transportation cart such as a u-boat or similar transportation trolley. Back section 1106 can first be attached to cart 1120 by wrapping back tab 1108 around the outside of side members 1402 of cart 1120 and wrapping side secure tab 1114 from the inside of side members 1402 of cart 1120 and securing the free end of side secure tab 1114 to the D-ring on the end of back tab 1108. This process is repeated until all complimentary back tabs 1108 and side secure tabs 1114 are connected on either end of cart 1120. As can be seen in FIG. 14, the D-ring, or other connector element, located on side secure member is now positioned at a point that is accessible for attachment of front tab 1104 as will be described.

In this example, cover section 1110 can be placed on the top of cart 1120 and cover tabs can be wrapped around top member 1404 of cart 1120 and secured to cover tab attachment point 1118. In this example configuration, front section 1102 is free to be folded over as shown in FIG. 15. In this configuration, items to be transported on cart 1120 can be loaded or removed from cart 1120 without the need to completely remove cart wrap 1100 from cart 1120. Furthermore, front section can be folded back over the open side of 1120 and secured in position by connecting front tabs 1104 to the D-rings positioned at the sides of cart 1120 on side secure tabs 1114.

As can be appreciated, the steps associated with the installation of cart wrap 1100 can be accomplished in different orders or not at all, depending on the configuration and attachment locations of the different elements. In the embodiment shown, when fully installed on a cart, cart wrap 1100 provides retention of material being transported on cart 1120. In addition, items can be easily loaded and unloaded by detaching and reattaching front section 1102 to cart 1120. Furthermore, cover section 1110, front section 1102, or back section 1106, if constructed of suitable material, can provide protection from rain, snow, wind, or other elements.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

The invention claimed is:
1. A transportation container retention device comprising:
a main panel including a first pocket, said first pocket attached along a first end of the main panel, the upper portion of the first pocket including an opening adapted to receive a first rod;
an extension panel including a bottom edge, the bottom edge integrally connected to a top edge of the main panel such that the extension panel can be moved from a first position in which the extension panel overlays the main panel to a second position in which the extension panel is contiguous to the main panel by moving the extension panel about the bottom edge;
a side strap connected to the main panel, said side strap operative to connect the first end and a second end of the main panel;
a restraint including a stiffening member comprising foam encased inside a length of nylon webbing, the restraint connected to a lower edge of the main panel at an oblique angle; and
a complimentary restraint attachment point connected to the lower edge of the main panel at an oblique angle, the restraint and the complimentary restraint attachment point adapted to secure the retention device to the transportation container;
wherein the transportation retention device is operable to retain a first height of articles in the first position and retain a second height of articles in the second position wherein the second height is larger than the first height.

\* \* \* \* \*